United States Patent
Lal et al.

(10) Patent No.: US 9,426,159 B2
(45) Date of Patent: Aug. 23, 2016

(54) SECURING SENSOR DATA

(71) Applicant: Intel Corporation, Santa Clara, CA (US)

(72) Inventors: Reshma Lal, Hillsboro, OR (US); Pradeep M. Pappachan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/498,701

(22) Filed: Sep. 26, 2014

(65) Prior Publication Data

US 2016/0094558 A1 Mar. 31, 2016

(51) Int. Cl.
*G06F 21/00* (2013.01)
*H04L 29/06* (2006.01)

(52) U.S. Cl.
CPC ........... *H04L 63/10* (2013.01); *H04L 63/0428* (2013.01); *H04L 63/061* (2013.01)

(58) Field of Classification Search
CPC .............................. H04L 63/10; H04L 63/061
See application file for complete search history.

(56) References Cited

U.S. PATENT DOCUMENTS

| | | |
|---|---|---|
| 6,937,814 B1 | 8/2005 | Chasen |
| 2006/0200859 A1 | 9/2006 | England |
| 2008/0144834 A1 | 6/2008 | Rakoff et al. |
| 2011/0161848 A1 | 6/2011 | Purcell et al. |
| 2011/0320823 A1* | 12/2011 | Saroiu ..................... G06F 21/57 713/189 |
| 2013/0246800 A1 | 9/2013 | Stewart |
| 2013/0291055 A1* | 10/2013 | Muppidi ................. H04L 63/20 726/1 |
| 2014/0006795 A1* | 1/2014 | Han ...................... H04L 9/3231 713/186 |
| 2014/0075496 A1 | 3/2014 | Prakash et al. |
| 2014/0123209 A1 | 5/2014 | Rajakarunanayake |
| 2014/0177839 A1 | 6/2014 | Wagner |
| 2015/0223092 A1* | 8/2015 | Schmidt ........... H04W 36/0022 455/418 |

FOREIGN PATENT DOCUMENTS

KR   10-2011-0046849   5/2011

OTHER PUBLICATIONS

PCT/US2015/051543, "Notification of Transmittal of the International Search Report and the Written Opinion of the International Searching Authority, or the Declaration" mailed Jan. 13, 2016, pp. 17.

* cited by examiner

*Primary Examiner* — Chau Le
*Assistant Examiner* — Ghodrat Jamshidi
(74) *Attorney, Agent, or Firm* — Blakely, Sokoloff, Taylor & Zafman LLP

(57) ABSTRACT

Systems and methods include establishing a secure communication between an application module and a sensor module. The application module is executing on an information-handling machine, and the sensor module is coupled to the information-handling machine. The establishment of the secure communication is at least partially facilitated by a mutually trusted module.

15 Claims, 7 Drawing Sheets

SECURING SENSOR DATA

A. RELATED APPLICATIONS

The subject matter of the present application is related to the subject matter of the following commonly assigned, co-pending application:

U.S. application Ser. No. 14/498,711, filed on Sep. 26, 2014, entitled "Securing Audio Communications" and naming PRADEEP M. PAPPACHAN, RESHMA LAL, RAKESH A. UGHREJA, KUMAR N. DWARAKA-NATH, and VICTORIA C. MOORE as inventors.

The above-referenced patent application is hereby incorporated by reference herein in its entirety.

B. BACKGROUND

Computing devices (such as smartphones, tablets, laptops, etc.) include a variety of sensors through which the devices can sense/detect general input from users, environmental conditions, the general status of the device, etc. Such sensors may include microphones, cameras, touch sensors, gesture sensors, movement sensors, light sensors, temperature sensors, location sensors, etc. As sensors becomes more pervasive, there is a growing concern for the security of the sensor data and the impact on the users' privacy.

Malware on a user's device can intercept and gain access to sensor data and thus gain access to private user data. Certain protections, therefore, may be needed in order to prevent unauthorized access to private sensor/speech data.

C. BRIEF DESCRIPTION OF THE DRAWINGS

Other objects and advantages of the invention may become apparent upon reading the detailed description and upon reference to the accompanying drawings.

Figure 1:
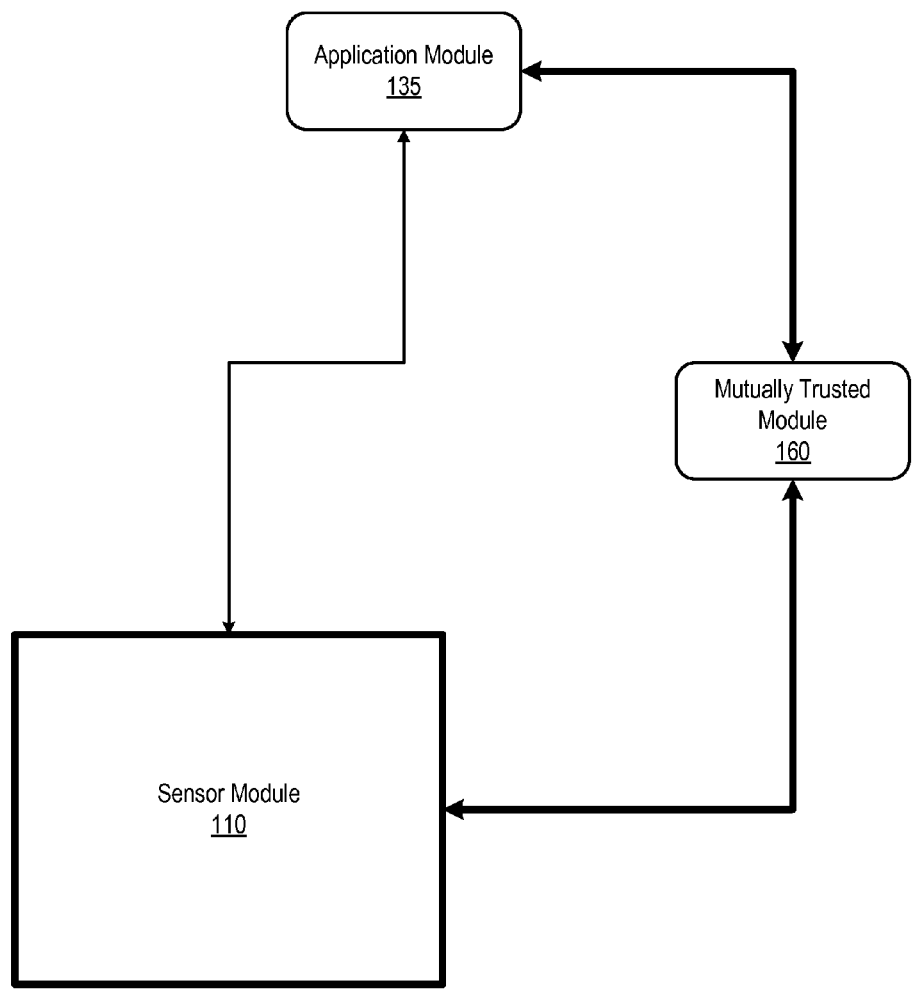
FIG. 1 is a block diagram illustrating a system configured to provide secure communications between an application module and a sensor module, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

D. DETAILED DESCRIPTION

FIG. 1 is a block diagram illustrating a system configured to provide secure communications between an application module and a sensor module, in accordance with some embodiments.

In some embodiments, sensor module 110 is configured to send sensor data to application module 135 after establishing a secure communication with the application module. Sensor module 110 may represent various types of sensors such as microphones, cameras, touch sensors, gesture sensors, movement sensors, light sensors, temperature sensors, location sensors, etc. Accordingly, sensor module 110 may be configured to generate and send to application module 110 audio data, video data, touch sensor data, gesture data, movement data, ambient light intensity data, ambient temperature, device location data, etc.

In some embodiments, sensor module 110 as well as application module 115 may be part of an information-handling/computational system/environment such as a personal laptop computer, a personal desktop computer, a smartphone, a specialized sensor system, etc. Captured data by sensor module 110 that is sent to application module 135 may be exposed to monitoring by other applications or malware executing in the same computational environment. Sensor data may generally contain private information to which access is preferably limited and controlled.

In some embodiments, mutually trusted module 160 is configured to facilitate, at least partially, the establishment of a cryptographically secure communication between application module 135 and sensor module 110. In some embodiments, by securing the exchange of sensor data between sensor module 110 and application module 135, it becomes very difficult, if not impossible, to intercept the sensor data by other, unauthorized application modules, the operating system, other operating system elements, etc. As such, it is very hard, if not impossible, for malware, such as ring 0 type malware, to gain unauthorized access to the encrypted sensor data exchanged between sensor module 110 and application module 135.

In some embodiments, mutually trusted module 160 may be configured to determine whether application module 115 is a trusted application module prior to facilitating the establishment of encrypted communication. In some embodiments, mutually trusted module 160 may be configured to determine the trustworthiness of the application module by determining whether application module 135 is part of a trusted computational/execution environment. Other methods may also be used by mutually trusted module in determining a trustworthiness of application module 135.

If the application module 115 is a trusted application module, mutually trusted module 160 may then facilitate the establishment of the cryptographically secure communication between application module 115 and sensor module 110. In some embodiments, mutually trusted module 160 may securely provide a secret cryptographic key to application module 115 and may securely provide the same cryptographic key to sensor module 110. Application module 115 and sensor module 110 may then use the secret keys to encrypt/decrypt sensor and other data exchanged between them. It should be noted that various other cryptography schemes may be employed to secure the communications.

In some implementations, a public/private key cryptography may be used where each party has a public key and private key pair, and the two parties exchange public keys. When the application module, for example, sends a message to the sensor, the application module encrypts the message using the sensor's public key. As such, only the sensor can decrypt the message using the sensor's private key. The sensor may encrypt messages for the application using the application's public key, and as such, the application may decrypt those messages using the application's private key.

In some implementations, the private key for one or more of the modules in the figure may be preprogrammed into the modules. For example, in embodiments where sensor module 110 and mutually trusted module 160 are implemented in hardware, the private key for the modules may be embedded into the modules during manufacturing in a way that the private key is not accessible from any other external modules or units.

After establishing a cryptographically secure communication, application module 115 and sensor module 110 may begin communicating securely. In some embodiments, application module 115 and sensor module 110 may communicate with each other directly. In other embodiments, the two modules may communicate via mutually trusted module 160. In yet other embodiments, the two modules may communicate via a communication bus shared with one or more other modules and the operating system. Yet other modes of communication (such as wireless communication) may be used.

In some embodiments, application module 135 may also transmit a session policy to sensor module 110. The session policy may include certain rules and conditions governing the operation of sensor module 110 and application module 135. For example, the session policy may dictate whether an application module has exclusive access to the sensor module for the duration of the session. Generally, the session policy may dictate such rules/conditions as: exclusive mode operation of the sensor module for the session (for example, only one application module is allowed access to the sensor data during the session). In other examples, multiple application modules may be allowed access to the sensor data, etc.

For example, a phone call application may require exclusive use of the microphone for the duration of the call to prevent malware from intercepting the conversation. In another example, a voice-based user-authentication software may not have a confidentiality requirement regarding the phrase being uttered. Rather, the application may have an integrity requirement over the voice sample to avoid modification or substitution. In this second example, the microphone may be shared with other applications.

In some embodiments, the encrypted sensor data remains private from other software and modules executing or existing on the system. Such software and modules may include, for example, system software, the kernel, sensor drivers in kernel space, sensor device drivers and middleware, etc. Therefore, in some embodiments, malware—even malware that can exploit vulnerabilities in system-level software, such as ring 0 type malware—may not be able to gain access the encrypted sensor data exchanged between sensor module 110 and application module 135.

In alternative embodiments, mutually trusted module 160 may be configured to facilitate the establishment of a cryptographically secure communication between application module 135 and mutually trusted module 160. In some embodiments, mutually trusted module 160 may also facilitate the secure exchange of one or more cryptographic keys between mutually trusted module 160 and application module 135 as part of establishing the cryptographically secure communication between application module 135 and mutually trusted module 160. In addition, mutually trusted module 160 may have a dedicated, direct, non-shared connection with sensor module 110. Accordingly, mutually trusted module 160 and application module 135 may exchange data securely using the established cryptographically secure communication, and mutually trusted module 160 may exchange data securely using the dedicated link between sensor module 110 and mutually trusted module 160. Thus, through these two secure connections, application module 135 may securely exchange data with sensor module 110.

In other alternative embodiments, mutually trusted module 160 may be configured to facilitate the establishment of a first restricted access to a memory range for application module 135. In addition, mutually trusted module 160 may be configured to facilitate the establishment of a second restricted access to the same memory range for sensor module 110. Accordingly, application module 135 and sensor module 110 may be able to communicate securely with each other by each writing and reading data from the memory range to which the two modules have restricted access.

In yet other alternative embodiments, mutually trusted module 160 may be physically included in sensor module 110. As such, one or more modules inside sensor module 110 may be configured to perform the functionality of mutually trusted module 160.

Figure 2:
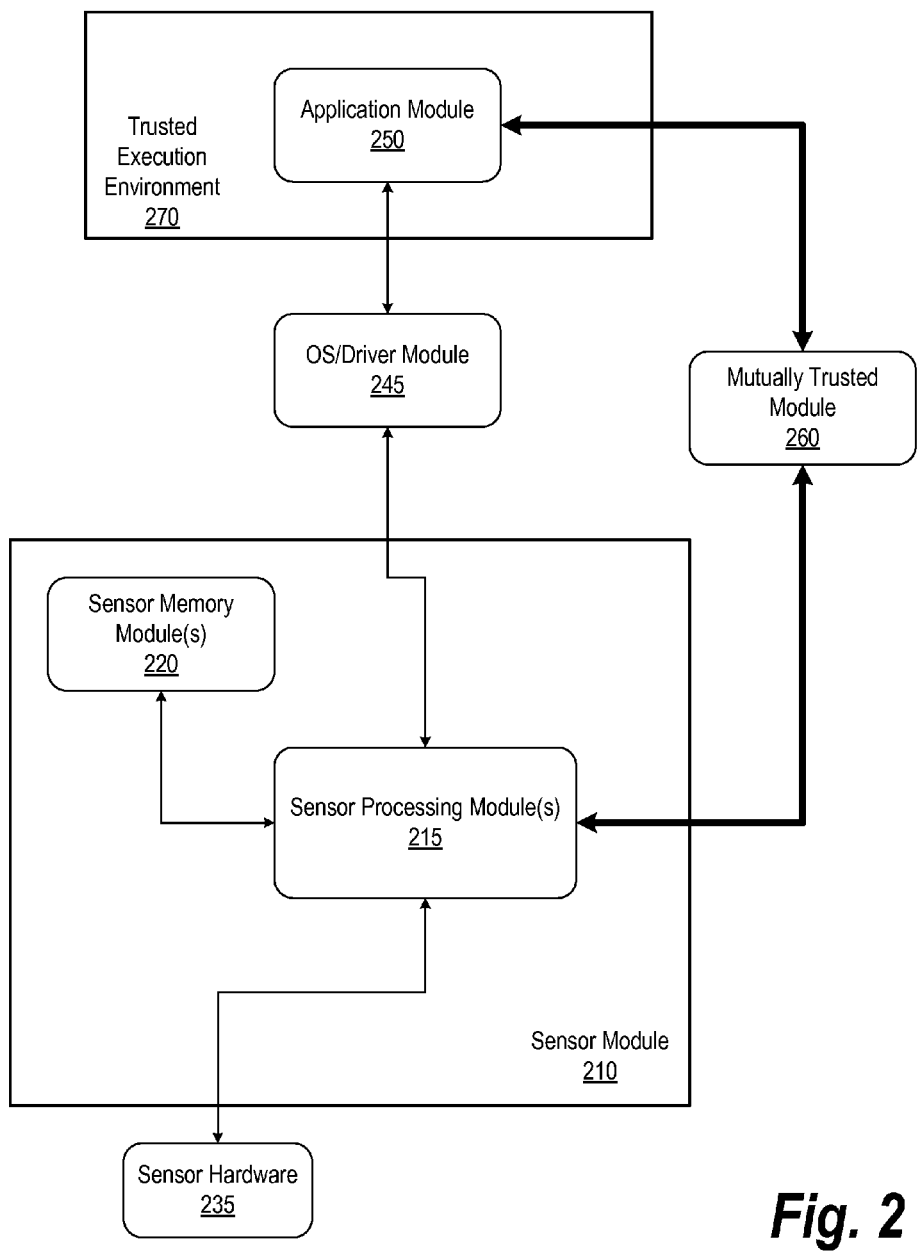
FIG. 2 is a block diagram illustrating another system configured to provide secure communications between an application module and a sensor module, in accordance with some embodiments.

FIG. 2 is a block diagram illustrating another system configured to provide secure communications between an application module and a sensor module, in accordance with some embodiments.

In some embodiments, sensor module 210 is configured to exchange sensor data securely with application module 250. Sensor module 210 may represent various types of sensors such as microphones, cameras, touch sensors, gesture sensors, movement sensors, light sensors, temperature sensors, location sensors, etc. Accordingly, sensor module 210 may be configured to generate and send to application module 210 audio data, video data, touch sensor data, gesture data, movement data, ambient light intensity data, ambient temperature, device location data, etc.

Sensor module 210 may also include one or more sensor processing modules 215, which are configured to perform processing functions as needed by sensor module 210. Sensor processing modules 215 may be configured, for example, to perform processing on the data received by sensor hardware 235. In some embodiments, sensor hardware 235 is configured to interface with the environment or the user in order to capture one or more types of data. In addition, sensor processing modules 215 may be configured to perform cryptographic-related computations for securing the exchange of data between sensor module 210 and application module 250.

In some embodiments, sensor module 210 as well as application module 250 may be part of an information-handling/computational system environment such as a personal laptop computer, a personal desktop computer, a smartphone, a specialized sensor computer system, etc. In some embodiments, the various modules/components shown in the figure may be located in multiple systems.

Captured data by sensor module 210 that is sent to application module 250 may be exposed to monitoring by other applications or malware executing in the same computational environment. Sensor data may generally contain private information, to which access is preferably limited and controlled.

In some embodiments, mutually trusted module 260 is configured to facilitate, at least partially, the establishment of a cryptographically secure communication between application module 250 and sensor module 210. In some embodiments, mutually trusted module 260 may be configured to determine whether application module 215 is a trusted application module as a condition to establishing a secure communication between application module 250 and sensor module 210. For example, in embodiments where a trusted execution environment exists in the computational system environment, an application module may be authenticated as a trusted application module in response to determining that the application is part of the trusted execution environment. It should be noted that other methods may be used to authenticate an application module as a trusted application module.

In some embodiments, sensor module 210 and mutually trusted module 260 may be preprogrammed with an inherent trust for each other. For example, trust between two hardware components such as mutually trusted module 260 and sensor module 210 may be established through private, dedicated bus/connection between the two devices. As such, the authentication between the two hardware devices is implicit by design.

In other implementations, application module 250 may produce a signed certificate, which may be verified by the mutually trusted entity.

In response to mutually trusted module 260 determining that an application module is trusted, mutually trusted module 260 may then facilitate the establishment of a cryptographically secure communication between application module 250 and sensor module 210. In some embodiments, mutually trusted module 260 may securely provide the same secret cryptographic key to application module 215 and sensor module 210. In some embodiments, mutually trusted module 260 may use a different encryption protocol for the secure transmission of the secret cryptographic keys to application module 215 and sensor module 210 than the encryption protocol being set up for the exchange of data between application module 215 and sensor module 210.

Application module 250 and sensor module 210 may then use the shared secret cryptographic key in encrypting/decrypting sensor data before transmission in order to communicate securely with each other. It should be noted that various other encryption protocols may be used for securing the communication between application module 250 and sensor module 210.

Trusted execution environment 270, to which application module 250 is a member, is a trusted environment for applications/application modules executing in the execution environment of the system. Various methods, modules, and systems, not described here, may be used for authenticating an application in trusted execution environment 270.

In some embodiments, application module 250 may open a secure sensor data session with sensor module 210 using the established cryptographically secure communication established by mutually trusted module 260. In some embodiments, the one or more sensor memory modules 220 may be configured to store encryption keys and also store encrypted and decrypted sensor data before/after processing, transmitting, or receiving. Sensor processing modules 215 may also be configured to perform encryption/decryption operations in addition to other sensor-related operations.

It should be noted that additional processing units may be used. For example, one or more processing units may be assigned to sensor data processing tasks, one or more processing units may be assigned to encryption/decryption tasks, etc. It should also be noted that one or more direct memory access units may be used to transfer data to/from sensor memory modules 220 as well data to/from other memory units, such as system memory assigned to the execution environment.

In some embodiments, mutually trusted module 260 is configured to generate additional keys as needed that may be used in providing additional protection the communication between application module 250 and sensor module 210. Mutually trusted module 260 may generate additional keys that may be used in protecting the integrity of the sensor data being exchanged, for example. In some embodiments, mutually trusted module 260 may be configured to generate one or more message authentication codes (MACs) that may be used to authenticate and/or verify the integrity of the sensor data being exchanged between application module 250 and sensor module 210. In some implementations, the message authentication codes may be used to authenticate the encrypted sensor data and to determine whether the sensor data was altered during transmission.

In some embodiments, after a cryptographically secure communication is set up, application module 250 may be configured to transmit a session ID and a session policy to sensor module 210 for the current session. The session ID may be used to identify subsequent communications that are part of that session, and the session policy may be used to set up one or more rules and conditions for sensor module 210.

Examples of rules/conditions that may be part of a session policy include: exclusive access to the sensor module by the application module; shared access to the sensor module by two or more application modules; disabling of traditional access to the sensor module (by the OS/driver 245, for example); etc.

It should be noted that, in some embodiments, the enforcement of the one or more rules and conditions dictated by the session policy may be implemented by sensor processing modules 215. In alternative embodiments, additional hardware (at specific communication paths, for example) may be used (or used in addition to the sensor processing modules) to enforce session policies. In some embodiments, a hardware-enforced session policy may restrict sensor access only to authorized software modules.

In some embodiments, sensor module 210 may dynamically program hardware-access control to prevent new requests from software modules to gain access to the sensor data if such requests violate the current session policy. The hardware-access control may continue to restrict access until a command by the currently authorized software module is received over the established secure communications channel to restore access to the sensor data to the OS and other software modules, for example.

In some embodiments, regardless of whether the OS/driver module 245 (or another application module and other sensor middleware) intercepts the secure sensor data exchanged between application module 250 and sensor module 210, the secure sensor data remains private.

In some embodiments, when application module 250 determines that the sensor session is complete, application module 250 may send a request to mutually trusted module 260 to initiate a termination of the secure session. In response, mutually trusted module 260 may inform sensor module 210 that the secure sensor session with application module 250 is ending. In alternative embodiments, application module 250 may communicate the termination of the sensor session directly to sensor module 210.

Sensor module 210 may then release any resources associated with the secure session and may then resume normal (unrestricted by an application module or session policy) operation. In some embodiments, sensor module 210 may now permit access to its resources by the operating system and other non-trusted application modules.

In some embodiments, if an application module terminates abnormally while in a secure communication session with sensor module 210, sensor module 210 (on its own or at the request of mutually trusted module 260) may end the secure session after a timeout period, for example. For example, application module 250 may be configured to transmit a "heartbeat" signal to indicate to mutually trusted module 260 and/or to sensor module 210 that the application module is still executing/functioning normally. Loss of the heartbeat signal may accordingly trigger the timeout period.

In some embodiments, more than one application module may be securely communicating with sensor module 210 at a given time. For example, a first application module may set up a secure session first with sensor module 210 and transmit a first session policy to sensor module 210. A second application module may then attempt to set up a session with sensor module 210 through mutually trusted module 260. Mutually trusted module 260 may grant the request and set up the communication if doing so is not in conflict with the first session policy, for example.

Figure 3:
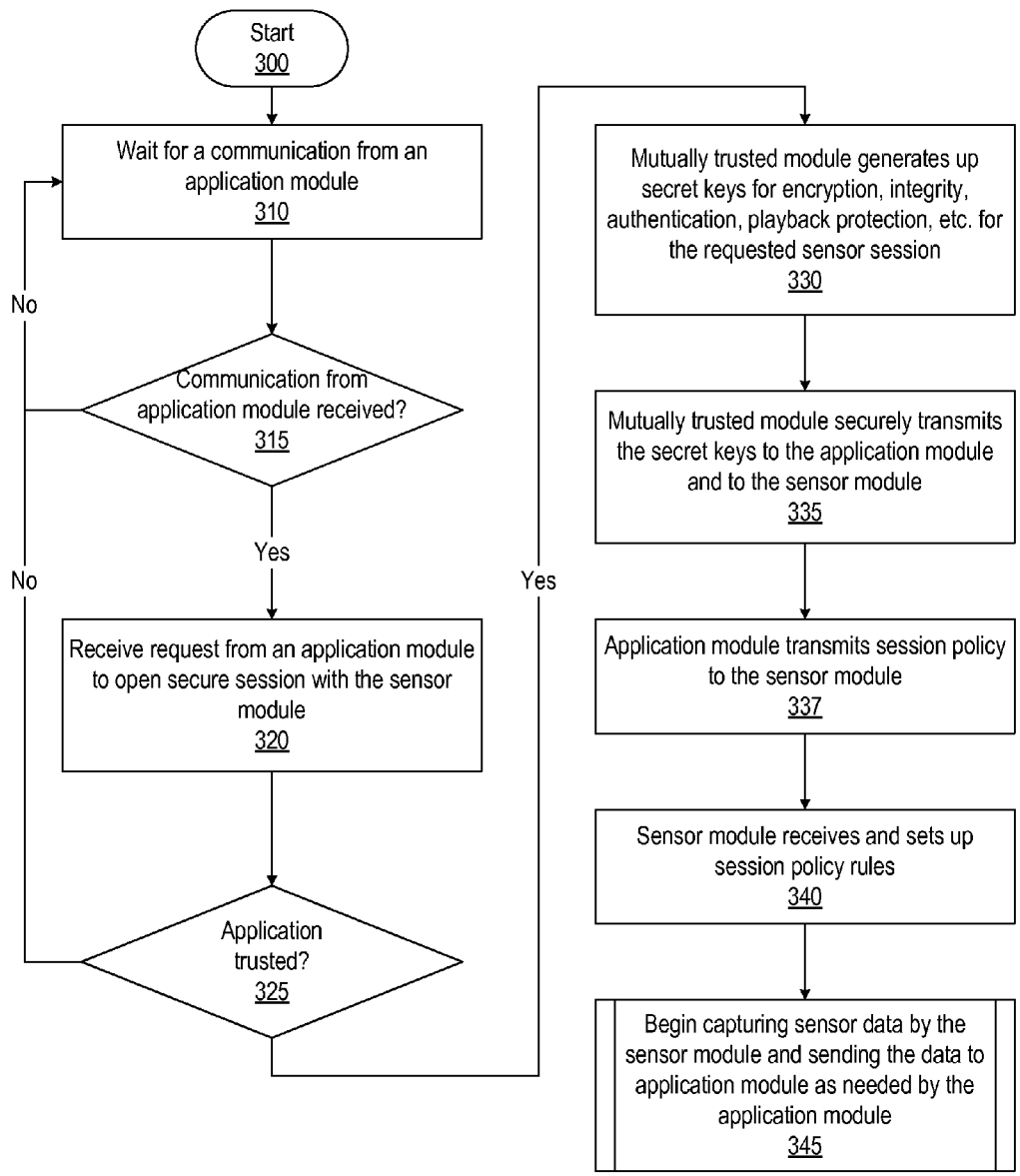
FIG. 3 is a flow diagram illustrating a method for establishing a secure communication session between an application module and a sensor module, in accordance with some embodiments.

FIG. 3 is a flow diagram illustrating a method for establishing a secure communication session between an application module and a sensor module, in accordance with some embodiments.

In some embodiments, the method described here may be implemented by one or more of the systems shown in FIG. 1 and FIG. 2.

In some embodiments, processing begins at 300 where, at block 310, the sensor module waits for communication from an application module. In some embodiments, the communication may be direct or through a mutually trusted module. At decision 315, a determination is made as to whether communication from an application module has been received. If communication from an application module has not been received, decision 315 branches to the "no" branch where processing returns to block 310.

On the other hand, if a communication from the application module has been received, decision 315 branches to the "yes" branch where, at block 320, a request from the application module is received to open a secure session with the sensor module. In some embodiments, the request may be received and processed by a mutually trusted module, a module that is mutually trusted by both the application module and the sensor module.

A determination is then made, at decision 325, as to whether the application module is a trusted application. In some embodiments, the application module may be determined to be a trusted application module if the application module is executing within a trusted execution environment on the system. In some embodiments, this determination may be made by the mutually trusted module. If the application module is not a trusted application module, decision 325 branches to the "no" branch where processing returns to block 310.

On the other hand, if the application module is a trusted application module, decision 325 branches to the "yes" branch where, at block 330, the mutually trusted module generates secret encryption keys that are to be used by the application module and the sensor module to communicate securely with each other. As needed, the mutually trusted module may also generate keys that may be used for integrity protection of the exchanged sensor data.

At block 335, mutually trusted module securely transmits the secret keys to the application module and to the sensor module. It should be noted that various other security/encryption schemes may be used to protect the exchange of sensor and other data between the application module and the sensor module.

At block 337, the application module securely transmits a session policy for the sensor session to the sensor module using the secure keys provided by the mutually trusted module. In some embodiments, the session policy may include certain rules/conditions for the sensor module—such as providing exclusive access to the sensor data to the application module. In addition, the sensor module may transmit other relevant information, such as a session ID, for example.

At block 340, sensor module receives the session policy transmitted by the application module. In response, the sensor module configures certain modules (such as the sensor module's processing units) that are part of the sensor module as needed in order to enforce the session policy.

At block 345, the sensor module begins capturing sensor data and securely (using the cryptographically secure communication that was set up) transmitting the sensor data to the application module as needed. The application module may then decrypt the sensor data and use as needed.

Figure 4:
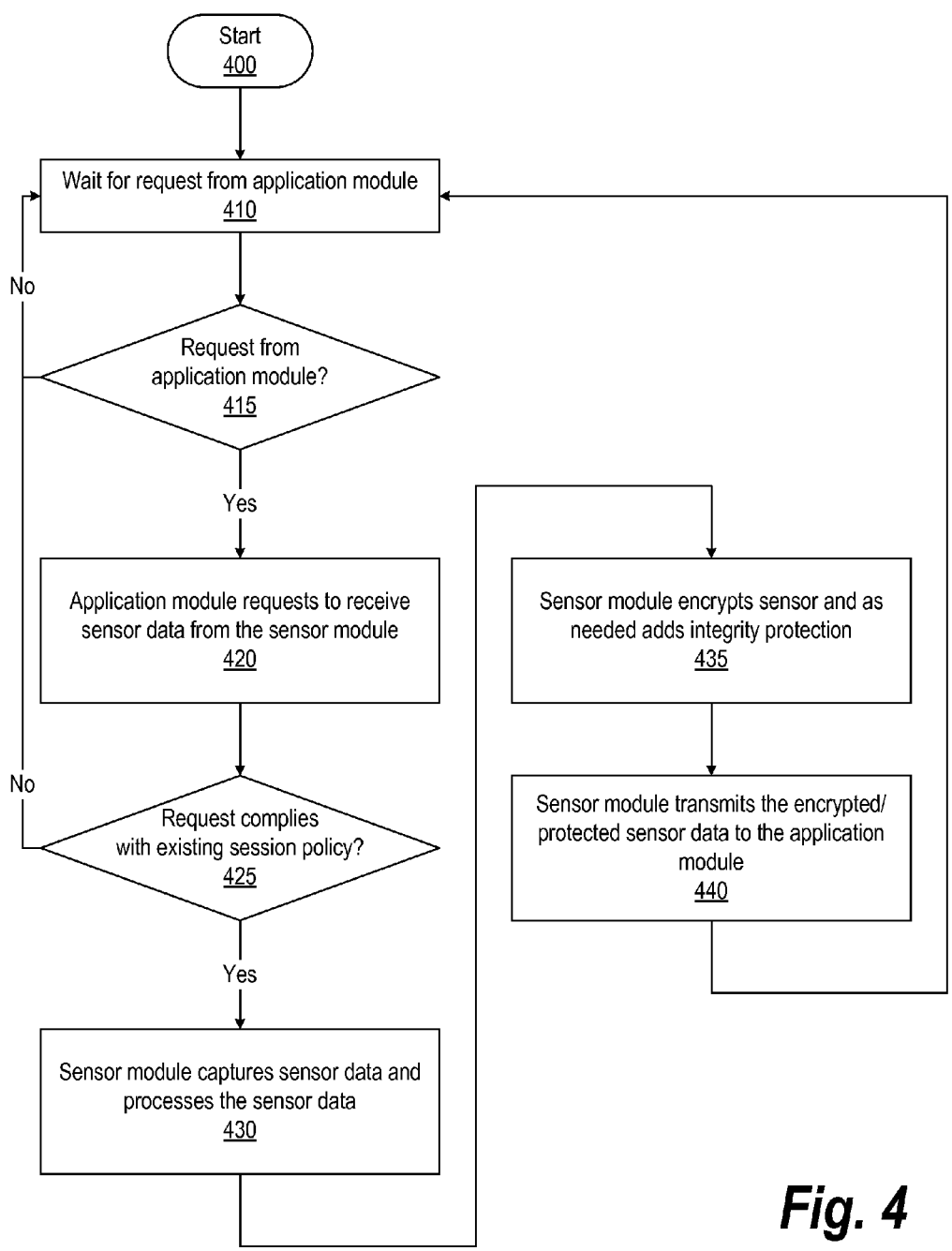
FIG. 4 is a flow diagram illustrating a method for securely transmitting captured sensor data from a sensor module to an application module, in accordance with some embodiments.

FIG. 4 is a flow diagram illustrating a method for securely transmitting captured sensor data from a sensor module to an application module, in accordance with some embodiments.

In some embodiments, the method described here may be implemented by one or more of the systems shown in FIG. 1 and FIG. 2. In some embodiments, the flow diagram in this figure may represent in more detail at least part of the functionality represented in block 345 of FIG. 3.

At block 410, the sensor module waits for a request from an application module. At decision 415, a determination is made as to whether a request from the application module has been received. If no request has been received from the application module, decision 415 branches to the "no" branch where processing loops back to block 410. It should be noted that, in some embodiments, the request may be received through a mutually trusted module.

On the other hand, if a request has been received from an application module, decision 415 branches to the "yes" branch where, at block 420, the application module requests to receive sensor data from the sensor module.

Another determination is then made, at decision 425, as to whether the request from the application module complies with an existing session policy. If the request does not comply with the existing session policy, decision 425 branches to "no" branch where processing again loops back to block 410. For example, a first application module may set up exclusive access to the sensor module through a first session policy. Accordingly, a request for access by a second application module may violate the existing session policy and may thus be denied.

In some embodiments, if a request for sensor input comes to the sensor module from a second application module, the sensor module will ignore the request. In some implementations, the sensor module may not be configured to process additional requests. In those implementations, hardware-based access control mechanisms in the sensor module may be used to deny the second application module access to the sensor data if the first application had requested exclusive access to the sensor module, for example.

On the other hand, if the request does comply with the existing session policy, decision 425 branches to the "yes" branch where, at block 430, the sensor module captures sensor data.

At block 435, the sensor module encrypts the sensor data. In addition and as needed, the sensor module may add integrity protection to the sensor data.

At block 440, the sensor module transmits the encrypted/protected sensor data to the application module. In some embodiments, the application module may then decrypt the sensor data and use as needed.

Processing subsequently returns to block 410.

Figure 5:
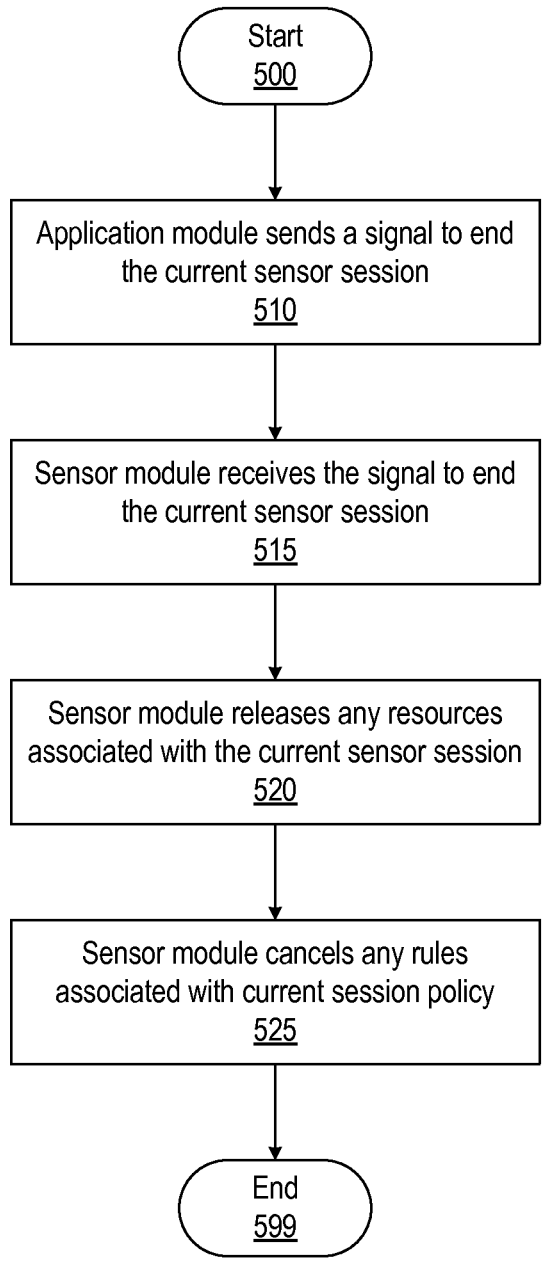
FIG. 5 is a flow diagram illustrating a method for terminating a secure session between an application module and a sensor module, in accordance with some embodiments.

FIG. 5 is a flow diagram illustrating a method for terminating a secure session between an application module and a sensor module, in accordance with some embodiments.

In some embodiments, the method described here may be implemented by one or more of the systems shown in FIG. 1 and FIG. 2.

Processing begins at 500 where, at block 510, the application module sends a signal indicating the end of the current sensor session, and at block 515, the sensor module receives the signal from the application module to end the current sensor session. In some embodiments, the application module may communicate the end of the sensor session to the sensor module through a mutually trusted module.

At block 520, the sensor module releases any resources associated with the sensor session, and at block at block 525, the sensor module cancels any rules/conditions that were put in place as part of the current session policy that was imposed by the application module. In some embodiments, the sensor module may now return to normal, non-secure operation until another application module requests a new secure sensor session.

Processing subsequently ends at 599.

Figure 6:
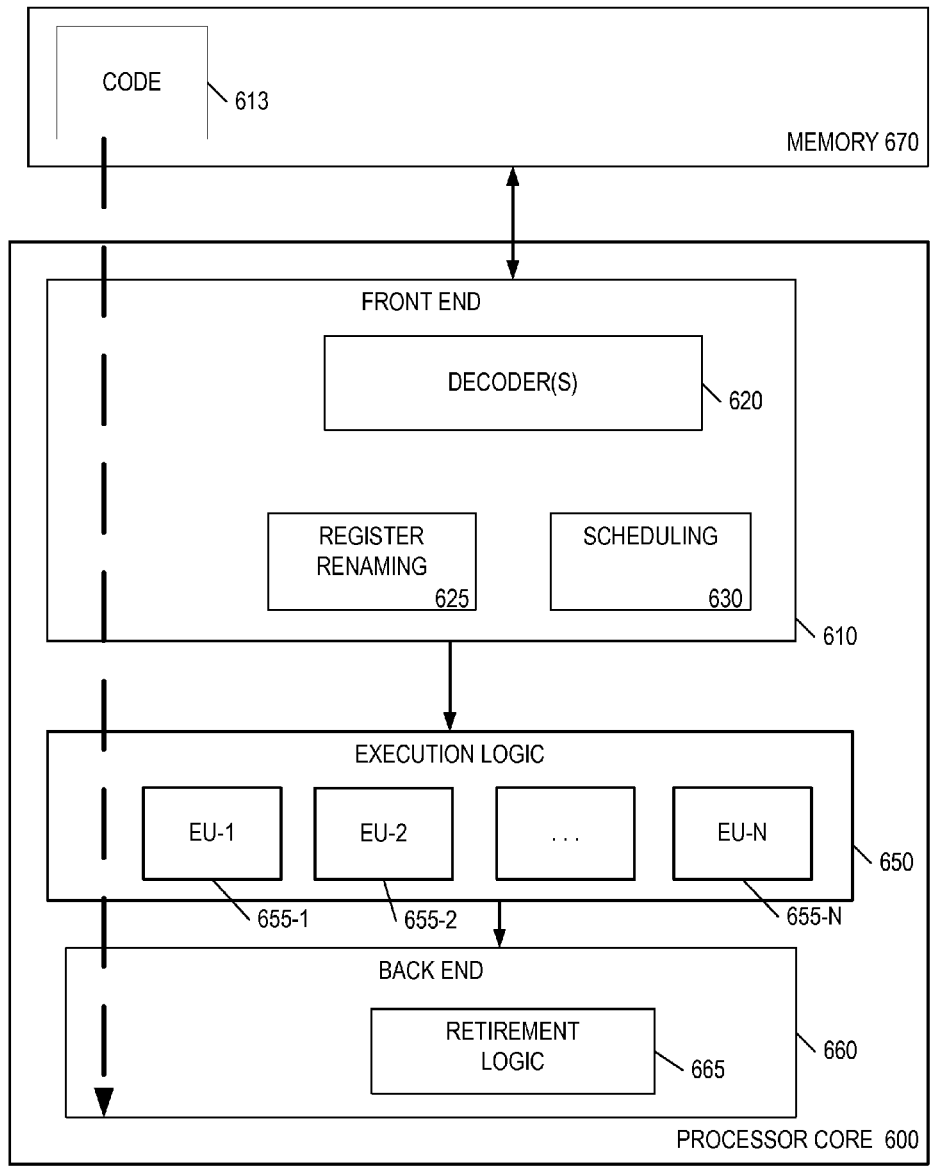
FIG. 6 is a block diagram illustrating a processor, in accordance with some embodiments.

FIG. 6 is a block diagram illustrating a processor, in accordance with some embodiments.

FIG. 6 illustrates a processor core 600 according to one embodiment. Processor core 600 may be the core for any type of processor, such as a micro-processor, an embedded processor, a digital signal processor (DSP), a network processor, or other device to execute code. Although only one processor core 600 is illustrated in FIG. 6, a processing element may alternatively include more than one of the processor core 600 illustrated in FIG. 6. Processor core 600 may be a single-threaded core or, for at least one embodiment, the processor core 600 may be multithreaded in that it may include more than one hardware thread context (or "logical processor") per core.

FIG. 6 also illustrates a memory 670 coupled to the processor 600. The memory 670 may be any of a wide variety of memories (including various layers of memory hierarchy) as are known or otherwise available to those of skill in the art. The memory 670 may include one or more code instruction(s) 613 to be executed by the processor 600 core. The processor core 600 follows a program sequence of instructions indicated by the code 613. Each instruction enters a front-end portion 610 and is processed by one or more decoders 620. The decoder may generate as its output a micro operation such as a fixed width micro operation in a predefined format, or may generate other instructions, microinstructions, or control signals, which reflect the original code instruction. The front end 610 also includes register renaming logic 625 and scheduling logic 630, which generally allocate resources and queue the operation corresponding to the convert instruction for execution.

The processor 600 is shown including execution logic 650 having a set of execution units 655-1, 655-2, through 655-N. Some embodiments may include a number of execution units dedicated to specific functions or sets of functions. Other embodiments may include only one execution unit or one execution unit that can perform a particular function. The execution logic 650 performs the operations specified by code instructions. After completion of execution of the operations specified by the code instructions, back end logic 660 retires the instructions of the code 613. In one embodiment, the processor 600 allows out of order execution but requires in order retirement of instructions. Retirement logic 665 may take a variety of forms as known to those of skill in the art (e.g., re-order buffers or the like). In this manner, the processor core 600 is transformed during execution of the code 613, at least in terms of the output generated by the decoder, the hardware registers and tables utilized by the register renaming logic 625, and any registers (not shown) modified by the execution logic 650.

Although not illustrated in FIG. 6, a processing element may include other elements on chip with the processor core 600. For example, a processing element may include memory control along with the processor core 600. The processing element may include I/O control logic and/or may include I/O control logic integrated with memory control logic. The processing element may also include one or more caches.

In some embodiments, code 613 may be configured to facilitate, at least partially, the establishment of a cryptographically secure communication between an application module and a sensor module. In some embodiments, the application module may be executing in a secure environment. In some embodiments, code 613 may be suitable to cause the transformation of registers or memory elements that correspond to the establishment of the cryptographically secure communication between an application module and a sensor module.

Figure 7:
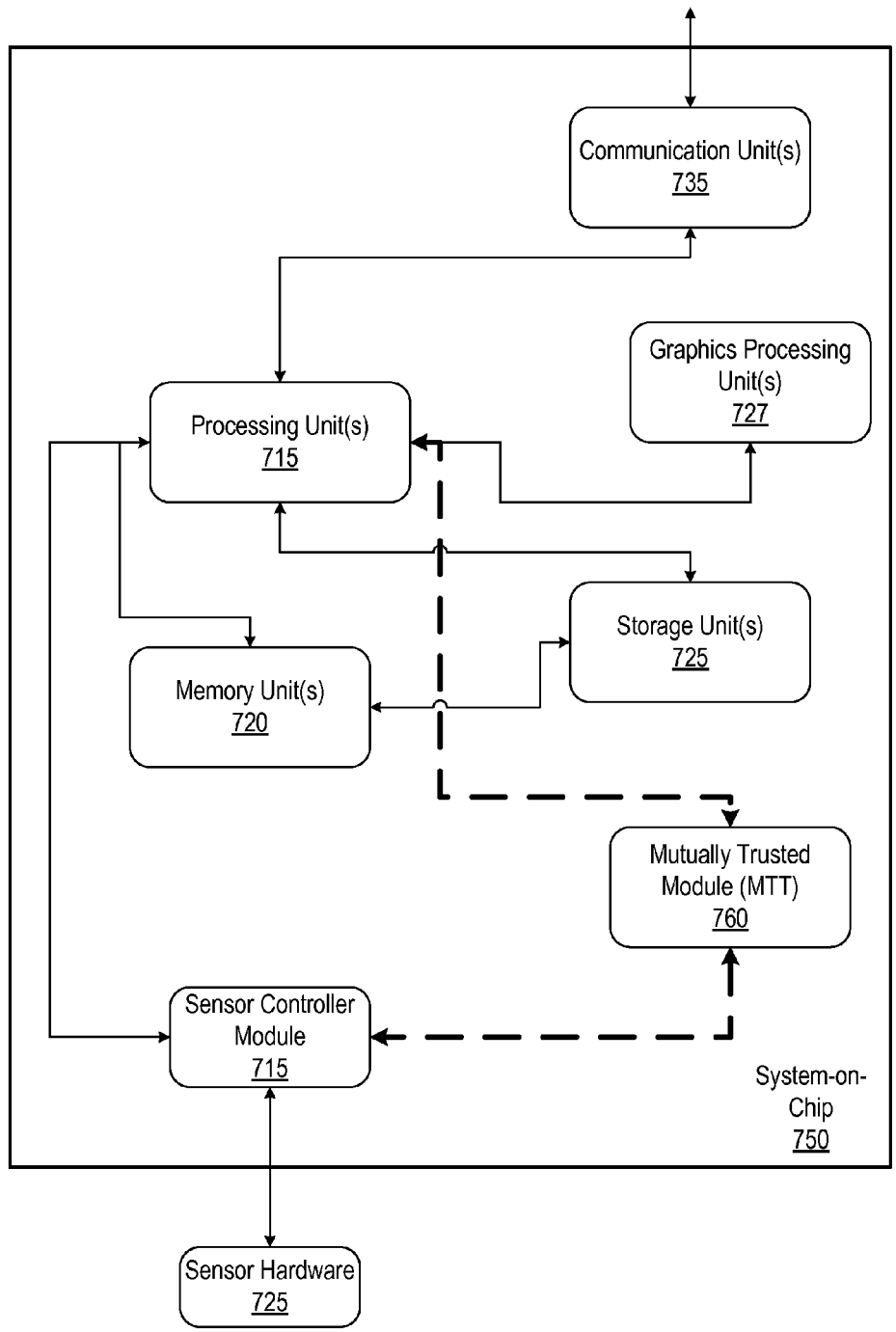
FIG. 7 is a block diagram illustrating including a system-on-chip configured to provide secure communications between an application module and a sensor module, in accordance with some embodiments.

FIG. 7 is a block diagram illustrating including a system-on-chip configured to provide secure communications between an application module and a sensor module, in accordance with some embodiments.

In some embodiments, system-on-chip 750 is another example of a system configured to, at least partially, establish a cryptographically secure communication between an application executing in the system and sensor controller module 715. Sensor controller 715 may be configured to securely transmit, to the application, sensor data captured by sensor hardware 725. In some embodiments, sensor controller 715, may be configured to securely transmit the data using the established cryptographically secure communication with the application.

It should be noted one or more additional components/units may be included in system-on-chip 750 and one or more of the components shown here may not be present in the system-on-chip 750. In addition, it should be noted that one or more of the components may be implemented in hardware, firmware, software or a combination of those. Furthermore, it should be noted that each of the one or more components may be implemented by one or more other units.

System-on-chip 750, which may be generally designed as a single integrated circuit package. In some implementations, system-on-chip 750 may be fabricated on a single semiconductor wafer substrate. In various examples, system-on-chip 750 may be constructed using various SOC designs and manufacturing methods to create effectively a small computing system. Among other units, system-onchip 750 may include processing units 715, memory units 720, storage units 725, graphics processing units 727, and communication units 735. It should be noted that in other implementations, one or more of the various devices and modules in system-on-chip 750 may be fabricated on separate semiconductor wafer substrates.

Additionally, coupled to system-on-chip 750 may be one or more cameras for capturing images/video, one or more microphones for capturing sensor, one or more antennas for facilitating electromagnetic transmission/reception for communication, one or more speakers for outputting sensor, one more touchscreens for outputting images/video and receiving user input, and one or more keyboards and mice for receiving user input. Furthermore, coupled to system-on-chip 750 may be one or more sensors such as location sensors, proximity sensors, light sensors, accelerometers, magnetic sensors, pressure sensors, temperature sensors, biometric security sensors, etc.

In some embodiments, instructions/software code may be stored in a combination of non-volatile/volatile memory such as storage units 725 and memory units 720. The instructions may be configured to be processed by processor 715 in order to facilitate at least some of the functionality of system-on-chip 750, such as facilitating, at least partially, the establishment of a secure communication between sensor module 715 and an application executing in the system. In yet other embodiments, at least some of the processing described above may be performed by mutually trusted module 760.

In some embodiments, system-on-chip 750 may be a portable device, such as a mobile phone, a smartphone with a touchscreen, a tablet, a laptop, a hybrid device, another communication device, etc.

Example 1 may include an information-handling system that may include a sensor module, an application module configured to execute on the information-handling system, and a mutually trusted module coupled to the sensor module and to the application module. The mutually trusted module is configured to facilitate, at least partially, the establishment of a secure communication between the application module and the sensor module.

Example 2 may include the system of example 1, where the mutually trusted module is configured to facilitate, at least partially, at least one of:
- an establishment of a cryptographically secure communication, including an exchange of one or more cryptographic keys, between the application module and the sensor module,
- an establishment of a cryptographically secure communication, including an exchange of one or more cryptographic keys with the application module, and a dedicated link between the sensor module and the mutually trusted module,
- an establishment of a first restricted access to a memory range for the application module, and of a second restricted access to the memory range for the sensor module, and
- an establishment of a cryptographically secure communication, including an exchange of one or more cryptographic keys, with the application module, and where the mutually trusted module is physically included in the sensor module.

Example 3 may include the system of example 1 or 2, where the mutually trusted module facilitating is based at least upon the mutually trusted module being configured to verify a trustworthiness of the application module.

Example 4 may include the system of example 1 or 2 or 3, where the mutually trusted module verifying a trustworthiness of the application module is based at least upon the mutually trusted module being configured to determine that the application module is executing in a trusted execution environment.

Example 5 may include the system of example 1 or 2 or 3 or 4, including the application module transmitting to the sensor module a session policy based at least upon the establishing the secure communication. The sensor module is configured to enforce the session policy using hardware in the sensor module.

Example 6 may include the system of example 1 or 2 or 3 or 4 or 5, including receiving a request from another application module for establishing another secure communication between the other application module and the sensor module. The mutually trusted module is configured to establish another secure communication based at least upon determining that the other application module is a trusted application module, and determining that the request is in agreement with the session policy.

Example 7 may include the system of example 1 or 2 or 3 or 4 or 5, where, based at least upon establishing a cryptographically secure communication the sensor module is configured to capture sensor data, encrypt the sensor data using the established cryptographically secure communication, and transmit the encrypted sensor data to the application module. The application module is configured to receive encrypted sensor data from the sensor module, decrypt the sensor data using the established cryptographically secure communication, and process the decrypted sensor data.

Example 8 may include a method for securely exchanging information, the method including establishing a secure communication between an application module and a sensor module. The application module is configured to execute on an information-handling machine. The sensor module is coupled to the information-handling machine. Establishing the secure communication is at least partially facilitated by a mutually trusted module.

Example 9 may include the method of example 8, where the mutually trusted module is configured to facilitate, at least partially, at least one of:
- an establishment of a cryptographically secure communication, including an exchange of one or more cryptographic keys, between the application module and the sensor module,
- an establishment of a cryptographically secure communication, including an exchange of one or more cryptographic keys between the application module, and a dedicated link between the sensor module and the mutually trusted module,
- an establishment of a first restricted access to a memory range for the application module, and of a second restricted access to the memory range for the sensor module, and
- an establishment of a cryptographically secure communication, including an exchange of one or more cryptographic keys, between the application module, and where the mutually trusted module is physically included in the sensor module.

Example 10 may include the method of examples 8 or 9, where the mutually trusted module facilitating the establishing is based at least upon the mutually trusted module being configured to verify a trustworthiness of the application module.

Example 11 may include the method of examples 8 or 9 or 10, where the mutually trusted module verifying a trustworthiness of the application module is based at least upon the mutually trusted module determining that the application module is executing in a trusted execution environment.

Example 12 may include the method of examples 8 or 9 or 10 or 11, including the application module transmitting to the sensor module a session policy based at least upon the establishing the secure communication. The sensor module is configured to enforce the session policy.

Example 13 may include the method of examples 8 or 9 or 10 or 11 or 12, including receiving a request from another application module for establishing another secure communication between the other application module and the sensor module. Establishing another secure communication is based at least upon determining that the other application module is a trusted application module, and determining that the request is in agreement with the session policy.

Example 14 may include the method of examples 8 or 9 or 10 or 11 or 12, where, based at least upon establishing a cryptographically secure communication the sensor module is configured to capture sensor data, encrypt the sensor data using the established secure communication, and transmit the encrypted sensor data to the application module. The application module is configured to receive encrypted sensor data from the sensor module, decrypt the sensor data using the established cryptographically secure communication, and process the decrypted sensor data.

Example 15 may include at least one non-transitory, machine-accessible storage medium having instructions stored thereon, where the instructions are configured, when executed on a machine, to cause the machine to establish a cryptographically secure communication between an application module and a sensor module. The application module is configured to execute on an information-handling machine.

Example 16 may include the at least one storage medium of example 15, where the instructions are configured to cause the machine to, at least partially, perform at least one of:
  an establishment of a cryptographically secure communication, including an exchange of one or more cryptographic keys, between the application module and the sensor module;
  an establishment of a cryptographically secure communication, including an exchange of one or more cryptographic keys between the application module, and a dedicated link between the sensor module and the mutually trusted module;
  an establishment of a first restricted access to a memory range for the application module, and of a second restricted access to the memory range for the sensor module; and
  an establishment of a cryptographically secure communication, including an exchange of one or more cryptographic keys, between the application module, and where the mutually trusted module is physically included in the sensor module.

Example 17 may include the at least one storage medium of example 15 or 16, where the instructions are configured to cause the machine to verify a trustworthiness of the application module.

Example 18 may include the at least one storage medium of example 15 or 16 or 17, where the instructions are configured to cause the machine to verify a trustworthiness of the application module based at least upon determining that the application module is executing in a trusted execution environment.

Example 19 may include the at least one storage medium of example 15 or 16 or 17 or 18, where the application module is configured to transmit to the sensor module a session policy based at least upon the establishing the cryptographically secure communication. The sensor module is configured to enforce the session policy.

Example 20 may include the at least one storage medium of example 15 or 16 or 17 or 18 or 19, including the instructions being configured to receive and process a request from another application module for establishing another secure communication between the other application module and the sensor module. The instructions are configured to cause the machine to establish another secure communication and the sensor module based at least upon determining that the other application module is a trusted application module, and determining that the request is in agreement with the session policy.

Example 21 may include the at least one storage medium of example 15 or 16 or 17 or 18 or 19, where, based at least upon establishing a cryptographically secure communication the sensor module is configured to capture sensor data, encrypt the sensor data using the established cryptographically secure communication, and transmit the encrypted sensor data to the application module. The application module is configured to receive encrypted sensor data from the sensor module, decrypt the sensor data using the established cryptographically secure communication, and process the decrypted sensor data.

Example 22 may include an apparatus for securely exchanging information. The apparatus includes means for facilitating, at least partially, an establishment of a secure communication between an application module and a sensor module. The application module is configured to execute on an information-handling machine, and the sensor module is coupled to the information-handling machine.

Example 23 may include the apparatus of example 22, including means for facilitating, at least partially, at least one of:
  an establishment of a cryptographically secure communication, including an exchange of one or more cryptographic keys, between the application module and the sensor module,
  an establishment of a cryptographically secure communication, including an exchange of one or more cryptographic keys between the application module, and a dedicated link between the sensor module and the means for facilitating,
  an establishment of a first restricted access to a memory range for the application module, and of a second restricted access to the memory range for the sensor module, and
  an establishment of a cryptographically secure communication, including an exchange of one or more cryptographic keys, between the application module, and where the means for facilitating is physically included in the sensor module.

Example 24 may include the apparatus of example 22 or 23, including means for verifying a trustworthiness of the application module.

Example 25 may include the apparatus of example 22 or 23 or 24, including means for determining that the application module is executing in a trusted execution environment.

Example 26 may include a mutually trusted module including one or more processors and one or more memory units coupled to the one or more processors. The mutually trusted module is configured to facilitate, at least partially, the establishment of a secure communication between an application module and a sensor module. The sensor module is coupled to the mutually trusted module, and the application module is coupled to the mutually trusted module and to the sensor module, and where the application module is configured to execute on an information-handling system.

Example 27 may include the mutually trusted module of example 26, configured to facilitate, at least partially, at least one of:
- an establishment of a cryptographically secure communication, including an exchange of one or more cryptographic keys, between the application module and the sensor module,
- an establishment of a cryptographically secure communication, including an exchange of one or more cryptographic keys with the application module, and a dedicated link between the sensor module and the mutually trusted module,
- an establishment of a first restricted access to a memory range for the application module, and of a second restricted access to the memory range for the sensor module, and
- an establishment of a cryptographically secure communication, including an exchange of one or more cryptographic keys, with the application module, and where the mutually trusted module is physically included in the sensor module.

Example 28 may include the mutually trusted module of example 26 or 27, configured to verify a trustworthiness of the application module.

Example 29 may include the mutually trusted module of example 26 or 27 or 28, configured to determine that the application module is executing in a trusted execution environment.

Example 30 may include the mutually trusted module of example 26 or 27 or 28 or 29, where the application module is configured to transmit to the sensor module a session policy based at least upon the establishing the secure communication. The sensor module is configured to enforce the session policy using hardware in the sensor module.

Example 31 may include the mutually trusted module of example 26 or 27 or 28 or 29 or 30, configured to receive a request from another application module for establishing another secure communication between the other application module and the sensor module. The mutually trusted module is configured to establish another secure communication based at least upon determining that the other application module is a trusted application module, and determining that the request is in agreement with the session policy.

Example 32 may include the mutually trusted module of example 26 or 27 or 28 or 29 or 30, where, based at least upon establishing a cryptographically secure communication, the sensor module is configured to capture sensor data, encrypt the sensor data using the established cryptographically secure communication, and transmit the encrypted sensor data to the application module. The application module is configured to receive encrypted sensor data from the sensor module, decrypt the sensor data using the established cryptographically secure communication, and process the decrypted sensor data.

Example 33 may include a sensor module including one or more processors and one or more memory units coupled to the one or more processors. The sensor module is configured to couple to a mutually trusted module, and the mutually trusted module is configured to facilitate, at least partially, the establishment of a secure communication between an application module and the sensor module. The application module is configured to execute on an information-handling system.

Example 34 may include the sensor module of example 33, where the mutually trusted module is configured to facilitate, at least partially, at least one of:
- an establishment of a cryptographically secure communication, including an exchange of one or more cryptographic keys, between the application module and the sensor module,
- an establishment of a cryptographically secure communication, including an exchange of one or more cryptographic keys with the application module, and a dedicated link between the sensor module and the mutually trusted module,
- an establishment of a first restricted access to a memory range for the application module, and of a second restricted access to the memory range for the sensor module, and
- an establishment of a cryptographically secure communication, including an exchange of one or more cryptographic keys, with the application module, and where the mutually trusted module is physically included in the sensor module.

Example 35 may include the sensor module of example 33 or 34, where the mutually trusted module facilitating is based at least upon the mutually trusted module being configured to verify a trustworthiness of the application module.

Example 36 may include the sensor module of example 33 or 34 or 35, where the mutually trusted module verifying a trustworthiness of the application module is based at least upon the mutually trusted module being configured to determine that the application module is executing in a trusted execution environment.

Example 37 may include the sensor module of example 33 or 34 or 35 or 36, including the application module transmitting to the sensor module a session policy based at least upon the establishing the secure communication. The sensor module is configured to enforce the session policy using hardware in the sensor module.

Example 38 may include the sensor module of example 33 or 34 or 35 or 36 or 37, including receiving a request from another application module for establishing another secure communication between the other application module and the sensor module. The mutually trusted module is configured to establish another secure communication based at least upon determining that the other application module is a trusted application module, and determining that the request is in agreement with the session policy.

Example 39 the sensor module of example 33, where, based at least upon establishing a cryptographically secure communication, the sensor module is configured to capture sensor data, encrypt the sensor data using the established cryptographically secure communication, and transmit the encrypted sensor data to the application module. The application module is configured to receive encrypted sensor data from the sensor module, decrypt the sensor data using the established cryptographically secure communication, and process the decrypted sensor data.

One or more embodiments of the invention are described above. It should be noted that these and any other embodiments are exemplary and are intended to be illustrative of the invention rather than limiting. While the invention is widely applicable to various types of systems, a skilled person will recognize that it is impossible to include all of the possible embodiments and contexts of the invention in this disclosure. Upon reading this disclosure, many alternative embodiments of the present invention will be apparent to persons of ordinary skill in the art.

Those of skill will appreciate that the various illustrative logical blocks, modules, circuits, and steps described in connection with the embodiments disclosed herein may be implemented as hardware, firmware, software, or combinations of those. To illustrate clearly this interchangeability of hardware, firmware, and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions and improvements fall within the scope of the invention as detailed within the following claims.

What is claimed is:

1. A system comprising:
a processing device coupled to a storage device;
a sensor module;
an application module, as facilitated by the processing device, configured to execute on the information-handling system; and
a mutually trusted module, as facilitated by the processing device, coupled to the sensor module and to the application module, wherein the mutually trusted module is configured to facilitate, at least partially, the establishment of a secure communication between the application module and the sensor module,
wherein the application module to transmit to the sensor module a session policy based at least upon the establishing the secure communication, wherein the session policy includes rules governing operations relating to the sensor module and the application module such that the session policy to dictate an exclusive session for a duration of time between the application module and the sensor module, and wherein the sensor module is configured to enforce the session policy, and
wherein the mutually trusted module is configured to facilitate, at least partially, at least one of
an establishment of a cryptographically secure communication, including an exchange of one or more cryptographic keys, between the application module and the sensor module,
an establishment of a cryptographically secure communication, including an exchange of one or more cryptographic keys with the application module, and a dedicated link between the sensor module and the mutually trusted module,
an establishment of a first restricted access to a memory range for the application module, and of a second restricted access to the memory range for the sensor module, and
an establishment of a cryptographically secure communication, including an exchange of one or more cryptographic keys, with the application module, and wherein the mutually trusted module is physically included in the sensor module.

2. The system of claim 1, wherein the mutually trusted module facilitating is based at least upon the mutually trusted module being configured to verify a trustworthiness of the application module.

3. The system of claim 2, wherein the mutually trusted module verifying a trustworthiness of the application module is based at least upon the mutually trusted module being configured to determine that the application module is executing in a trusted execution environment.

4. The system of claim 1, comprising:
the application module to receive a request from another application module to establish another secure communication between the other application module and the sensor module;
the mutually trusted module being configured to establish another secure communication based at least upon:
determining that the other application module is a trusted application module, and
determining that the request is in agreement with the session policy.

5. The system of claim 1, wherein, based at least upon establishing a cryptographically secure communication:
the sensor module is configured to capture sensor data, encrypt the sensor data using the established cryptographically secure communication, and transmit the encrypted sensor data to the application module, and
the application module is configured to receive encrypted sensor data from the sensor module, decrypt the sensor data using the established cryptographically secure communication, and process the decrypted sensor data.

6. A method for securely exchanging information, the method comprising:
establishing a secure communication between an application module and a sensor module, wherein the application module is executing on an information-handling machine and wherein the sensor module is coupled to the information-handling machine, wherein the establishing is at least partially facilitated by a mutually trusted module;
transmitting, by the application module, a session policy to the sensor module based at least upon the establishing the secure communication, wherein the session policy includes rules governing operations relating to the sensor module and the application module such that the session policy to dictate an exclusive session for a duration of time between the application module and the sensor module, and wherein the sensor module is configured to enforce the session policy; and facilitating, by the trusted module, at least partially, at least one of establishment of a cryptographically secure communication, including a secure exchange of one or more cryptographic keys, between the application module and the sensor module, establishment of a cryptographically secure communication, including an exchange of one or more cryptographic keys between the application module, and a dedicated link between the sensor module and the mutually trusted module, establishment of a first restricted access to a memory range for the application module, and of a second restricted access to the memory range for the sensor module, and establishment of a cryptographically secure communication, including an exchange of one or more cryptographic keys, between the application module, and wherein the mutually trusted module is physically included in the sensor module.

7. The method of claim 6, wherein facilitating the establishing is based at least upon the mutually trusted module being configured to verify a trustworthiness of the application module.

8. The method of claim 7, further comprising verifying, by the mutually trusted module, a trustworthiness of the application module i-s based at least upon the mutually trusted module determining that the application module is executing in a trusted execution environment.

9. The method of claim 6, comprising:
the application module to receive a request from another application module to establish another secure communication between the other application module and the sensor module;
the mutually trusted module establishing another secure communication based at least upon:
determining that the other application module is a trusted application module, and
determining that the request is in agreement with the session policy.

10. The method of claim 6, wherein, based at least upon establishing a cryptographically secure communication:
the sensor module is configured to capture sensor data, encrypt the sensor data using the established secure communication, and transmit the encrypted sensor data to the application module, and
the application module is configured to receive encrypted sensor data from the sensor module, decrypt the sensor data using the established cryptographically secure communication, and process the decrypted sensor data.

11. At least one non-transitory, machine-accessible storage medium having instructions stored thereon, wherein the instructions are configured, when executed on a machine, to cause the machine to:
establish a cryptographically secure communication between an application module and a sensor module, wherein the application module is configured to execute on an information-handling machine;

transmit, by the application module, a session policy to the sensor module based at least upon the establishing the secure communication, wherein the session policy includes rules governing operations relating to the sensor module and the application module such that the session policy to dictate an exclusive session for a duration of time between the application module and the sensor module, and wherein the sensor module is configured to enforce the session policy; and facilitate, by the trusted module, at least partially, at least one of establishment of a cryptographically secure communication, including a secure exchange of one or more cryptographic keys, between the application module and the sensor module, establishment of a cryptographically secure communication, including an exchange of one or more cryptographic keys between the application module, and a dedicated link between the sensor module and the mutually trusted module, establishment of a first restricted access to a memory range for the application module, and of a second restricted access to the memory range for the sensor module, and establishment of a cryptographically secure communication, including an exchange of one or more cryptographic keys, between the application module, and wherein the mutually trusted module is physically included in the sensor module.

12. The at least one storage medium of claim 11, wherein the instructions are configured to cause the machine to verify a trustworthiness of the application module.

13. The at least one storage medium of claim 12, wherein the instructions are configured to cause the machine to verify the trustworthiness of the application module based at least upon determining that the application module is executing in a trusted execution environment.

14. The at least one storage medium of claim 11, comprising:
configuring the instructions to receive and process a request from another application module for establishing another secure communication between the other application module and the sensor module;
wherein the instructions are configured to cause the machine to establish another secure communication and the sensor module based at least upon:
determining that the other application module is a trusted application module, and
determining that the request is in agreement with the session policy.

15. The at least one storage medium of claim 11, wherein, based at least upon establishing a cryptographically secure communication:
the sensor module is configured to capture sensor data, encrypt the sensor data using the established cryptographically secure communication, and transmit the encrypted sensor data to the application module, and
the application module is configured to receive encrypted sensor data from the sensor module, decrypt the sensor data using the established cryptographically secure communication, and process the decrypted sensor data.

* * * * *